UNITED STATES PATENT OFFICE.

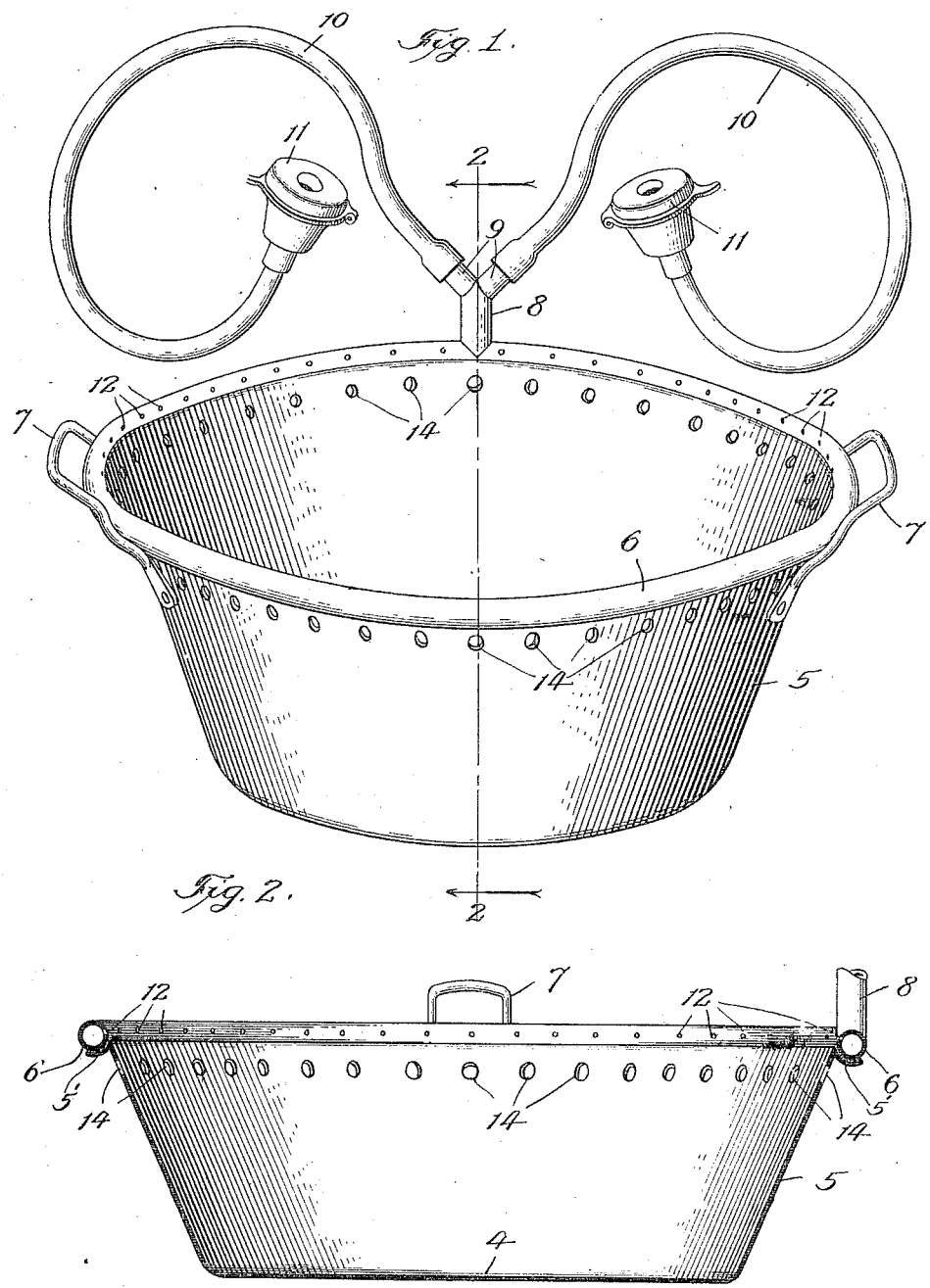

VINCENT G. PONIC, OF CHICAGO, ILLINOIS.

DISH-PAN.

1,284,139.  Specification of Letters Patent.  Patented Nov. 5, 1918.

Application filed February 16, 1917. Serial No. 148,966.

*To all whom it may concern:*

Be it known that I, VINCENT G. PONIC, a citizen of the United States, and a resident of Chicago, in the county of Cook and State of Illinois, have invented certain new and useful Improvements in Dish-Pans, of which the following is a full, clear, and exact description.

The invention relates to dish pans.

One object of the invention is to provide an improved dish pan which is provided with means for spraying the dishes as they are removed from the pan and in which provision is made for carrying off the grease and other matter removed from the dishes.

A further object of the invention is to provide an improved dish pan equipped with means for connecting it to one or more faucets and with a device for discharging a spray into the pan to keep the water clean.

The invention consists in the several novel features hereinafter set forth and more particularly defined by claim at the conclusion hereof.

In the drawings: Figure 1 is a perspective of a dish pan embodying the invention. Fig. 2 is a vertical section taken on line 2—2 of Fig. 1.

The invention comprises a dish pan formed of a bottom 4 and a flared annular body 5, the upper end of which is soldered on, as at 5', to an annular spring pipe 6. Handles 7 are secured to the body 5 so that the pan may be conveniently lifted and moved. A vertical pipe 8 is connected to the pipe 6 and is provided with branches 9, 9. Each branch is connected to a flexible hose 10 provided with a suitable coupling 11 adapted to fit over a water-supply faucet. The purpose in providing two hose connections, 10 and couplings 11 is to provide for a supply of hot and cold water from the usual hot and cold water faucets, so that either hot, cold or temperate water may be supplied to the spray-pipe 6. Obviously, by regulation of the faucets, any desired temperature of water may be supplied to the pan. If it is desired to use the dish pan where there is but a single faucet, one hose 10 can be disconnected from one of the branches 9 and the latter can be closed by a suitable stopper-plug. The annular pipe 6 is provided with spray holes 12 for spraying water inwardly or toward the center of the pan. Below the annular pipe 6, there is formed a series of overflow openings 14 through which water will escape from the pan and carry with it the floating grease and other matter.

In operation, assuming the couplings 10 to be connected to hot and cold water supply faucets, water therefrom will flow through the pipe 8 in which the hot and cold water will be mixed and from which it will flow into the annular spray pipe 6. The water will be discharged from the spray pipe in centrally directed streams through openings 12. While the spray is in operation, the dishes in the pan can be washed with a cloth if desired and as the grease and dirt are loosened, they will be carried outwardly with the current through holes 14 and be discharged from the pan into the sink in which the dish pan is usually set while it is being used. If a dish can be held in the spray while being washed so that it will be subjected to a constant spray of clean water. As a dish is being lifted out of the body of a pan, it will be subjected to a clean spray of water from the pipe 6 and thereby rinsed with clean water.

The invention exemplifies a dish pan in which provision is made for a constant spray of water directed to carry off the grease and impurities loosened from the dishes and in which the spray is arranged to rinse the dishes with fresh water as they are being lifted out of the pan. Also an improved dish pan provided with a spraying device and detachable flexible connections for faucets so that it can be conveniently connected thereto and used in any desired part of the sink.

The invention is not to be understood as restricted to the details set forth, since these may be modified within the scope of the appended claim, without departing from the spirit and scope of the invention.

Having thus described the invention, what I claim as new and desire to secure by Letters Patent, is:

A portable dish pan comprising a pan, a spray pipe around the upper end of the pan, and a detachable flexible connection whereby water may be supplied to the spray-pipe from a faucet, the pan being provided with overflow openings below the spray pipe and near the upper end of the pan.

VINCENT G. PONIC.